United States Patent [19]

Kuhn, Jr. et al.

[11] 3,728,554

[45] Apr. 17, 1973

[54] MICROPOWER ZERO-CROSSING DETECTOR

[75] Inventors: Harry A. Kuhn, Jr., Phoenix; James W. Foltz, Scottsdale, both of Ariz.

[73] Assignee: Motorola, Inc., Franklin Park, Ill.

[22] Filed: Apr. 17, 1972

[21] Appl. No.: 244,489

[52] U.S. Cl. ..................307/233, 307/235, 307/236, 307/251, 307/255, 328/138, 330/30 D

[51] Int. Cl. ..............................................H03k 5/18

[58] Field of Search......................307/235, 236, 251, 307/255, 304, 233; 328/138; 330/30 D

[56] References Cited

UNITED STATES PATENTS

| | | | |
|---|---|---|---|
| 3,493,877 | 2/1970 | Jacobson | 307/233 X |
| 3,517,213 | 6/1970 | Britton | 307/236 X |
| 3,535,658 | 10/1970 | Webb | 307/233 X |
| 3,585,400 | 6/1971 | Brayton | 307/233 |
| 3,697,782 | 10/1972 | Matouka | 307/235 |

*Primary Examiner*—John S. Heyman
*Attorney*—Vincent J. Rauner et al.

[57] ABSTRACT

A pulse is produced at the output of a detector in response to the zero crossings of an analog electronic signal input up to a predetermined input frequency. When that frequency level is exceeded, an indicator voltage level is produced at the output. The apparatus for producing the output pulses and the indicator voltage level is comprised of complementary field effect transistors, requiring very little power. The input of the device is a bi-polar transistor type differential amplifier, the combination providing a zero crossing detector having a much higher frequency response than such a device comprised entirely of complementary field effect transistors, and requiring less power than such devices comprised of bi-polar transistors.

7 Claims, 3 Drawing Figures

MICROPOWER ZERO-CROSSING DETECTOR

BACKGROUND OF THE INVENTION

1. Field of the Invention

Present data handling and analysis is accomplished largely through the proper use of digital computers. Conversions from analog signals to digital signals representative of the analog amplitude has become an important technology. Producing a pulse whenever an alternating signal passes through zero enables measurement of, for example, the rotational speed of a rotating object that generates a sine wave representative of that speed. A device for producing such pulses is known as a zero crossing detector.

2. Description of the Prior Art

Zero crossing detectors are old in the art. Devices capable of detecting very high frequency analog signal zero crossings and producing corresponding pulses have been made of bi-polar transistors. They have had the disadvantage of requiring a relatively large amount of power. They also do not lend themselves well to an integrated, monolithic structure.

Field effect transistors (FET's) have been incorporated in zero crossing detectors and have had the disadvantage of speed lower than that of the detector incorporating bi-polar transistors.

Zero crossing detectors have been made of complementary FET's, specifically complementary metal oxide silicon types (CMOS). These circuits lend themselves well to integrated circuit, monolithic structure. The power requirement is minuscule, but they have the disadvantage of being quite slow in comparison with the bi-polar devices.

The FET's and CMOS devices often will not provide the frequency response required for present day applications. The circuit designer, to make a zero crossing detector sufficiently fast, commonly makes them using the bi-polar transistor as the basic transistor of the detector. The finished bi-polar transistor detector is often capable of speed far in excess of that required. On the other hand, devices comprised of FET's or CMOS circuits may fall far short of the required speed. Our invention provides a combination of CMOS and bi-polar transistors resulting in a detector having a frequency capability above that of one incorporating CMOS alone and below that of one incorporating bi-polar transistors alone. The combination bi-polar and CMOS transistor detector of this invention requires power for its operation that is far below that of a detector utilizing only bi-polar transistors, but somewhat more than the slower detector utilizing only FET's or CMOS devices.

BRIEF SUMMARY OF THE INVENTION

A well known, bi-polar transistor pair configured as a differential amplifier serves as the input stage to the zero crossing detector and frequency latch of this invention. It is capable of producing complementary pulses at the zero crossing point of exceedingly high speed analog input signals. The complementary pulses are then sent to the CMOS section which comprises a detecting section and a frequency latch circuit. One polarity of the complementary signals is sent directly to a NAND circuit in the detecting section, and to an inverter whose output serves as another input to the NAND circuit. The output of this NAND circuit then, is a unidirectional pulse having a time width determined by the transit time through the inverter.

Both complementary signals are sent to the frequency latch circuit. The frequency latch circuit has an output connected to a NAND circuit which has as another input, the output from the detecting circuit. The frequency latch circuit conditions this last mentioned NAND circuit to invert the unidirectional pulses from the detecting circuit. The frequency latch circuit will continue to function in this way until an upper frequency limit is reached. In the preferred embodiment, this upper limit is approximately 1 Megahertz. At that point, two special input inverters for the frequency latch circuit cut off. They are designed to cut off before all of the other CMOS components and are also designed to cut off in a prescribed state. If the more positive voltage used in this circuit is arbitrarily designated as a binary "1" and the lower voltage designated a binary "0", then the two inverters cut off so that their respective outputs go to "0". When this happens, the unidirectional pulses out of the detector are no longer passed through the last NAND gate, but rather its output goes to a prescribed steady state of binary "1".

DETAILED DESCRIPTION

Figure 1:
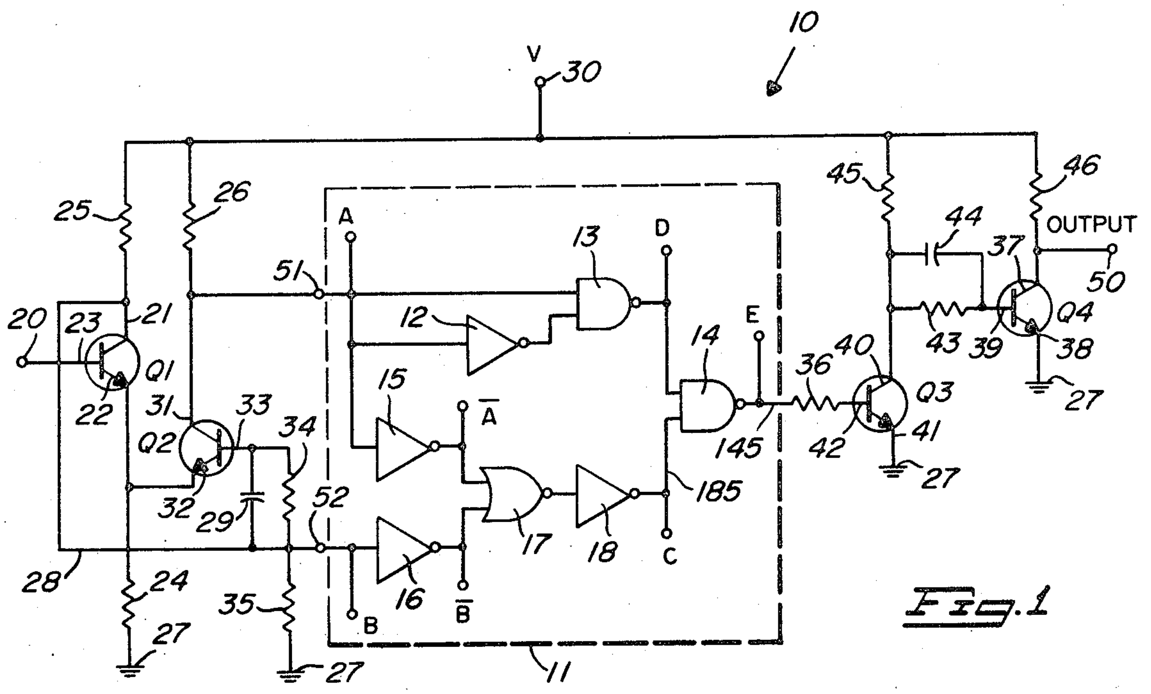
FIG. 1 shows the entire detector, partially in schematic and partially in block form.

Referring first to FIG. 1, transistors Q1 and Q2 form a differential amplifier. An analog voltage is received at terminal 20 and is impressed on base 23 of transistor Q1. The emitter 22 of transistor Q1 and emitter 32 of transistor Q2 are each connected to resistor 24 which is connected to ground 27. The collector 21 of Q1 and the collector 31 of Q2 each are connected to parallel resistors 25 and 26 respectively, each of which go to a positive source of voltage 30. Collector 21 is also connected to conductor 28 which is connected to terminal 52. Also connected to conductor 28 is capacitor 29 which is connected at its other side to the base 33 of transistor Q2. The base 33 of transistor Q2 is also connected to a mid point between resistor 34 whose other end is connected to conductor 28, and resistor 35 whose other end is connected to ground 27.

The crossing detector and frequency latch 11 is shown in block form and will be discussed in detail with reference to FIG. 2. The detector and frequency latch 11 has input terminals 51 and 52 and an output on conductor 145.

Conductor 145 is connected to resistor 36 which in turn is connected to the base 42 of transistor Q3. Transistors Q3 and Q4, together with the associated capacitor and resistors form an output buffer and filter which is added to delineate the transition between states, to produce either a series of unidirectional pulses or a static "1". Those skilled in the art will appreciate that such an output circuit is susceptible of many permeatations of design. Specifically, the emitter 41 of transistor Q3 and the emitter 38 of transistor Q4 are each connected to ground 27. The collectors 40 and 37 of Q3 and Q4 respectively are each connected to separate, parallel resistors which in turn are connected to the positive voltage source 30. The collector 40 of transistor Q3 is also connected to the base 39 of transistor Q4 through resistor 43 which is bypassed by capacitor 44. The output of the device is taken at terminal 50 which is connected to the collector 37 of transistor Q4.

Figure 2:
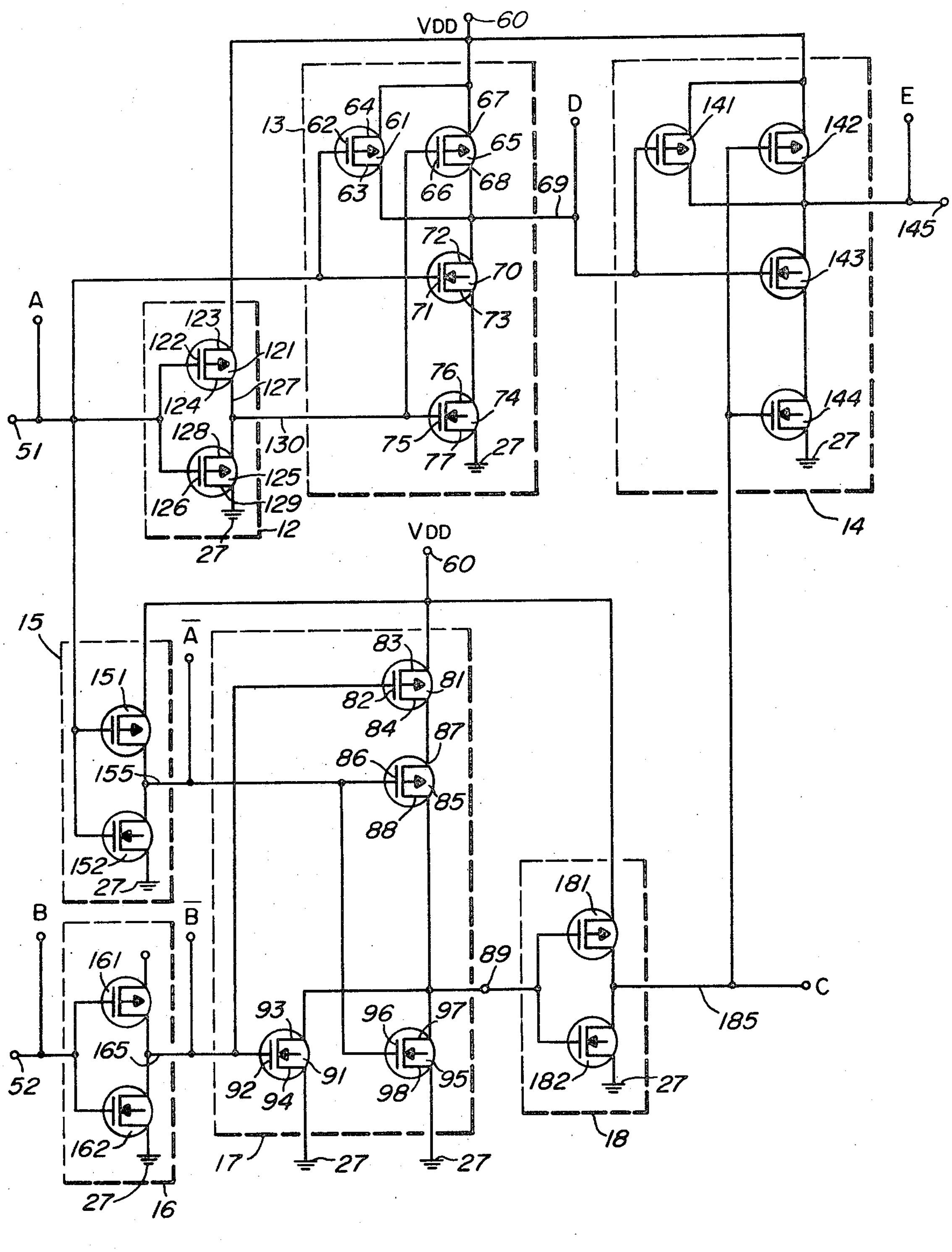
FIG. 2 schematically shows the detecting section and the frequency latch section.

FIG. 2 is a schematic diagram of the detector and frequency latch 11 of FIG. 1. The numbering has been kept as consistent as possible between FIGS. 1 and 2 to avoid confusion. For example, inverter 12 shown in FIG. 1 in block form is indicated in FIG. 2 by a dash line rectangle enclosing a CMOS circuit. Since these devices are completely bilateral, there will be no effort made in this description to differentiate between the "-source" and "drain", but each will be referred to as a "-main electrode."

The inverter 12 is made up of a P channel device 121 having a gate 122 and main electrodes 123 and 124 and an N channel device 125 having a gate 126 and main electrodes 128 and 129. The output is taken at the junction between main electrodes 124 and 127. The input from terminal 51 is applied to gates 122 and 126. In general terms, one voltage level causes one device to operate, while the other voltage level causes the other device to operate. This operation results in the voltage $V_{DD}$ from terminal 60 being applied to output line 130 as a "1", or the ground potential of ground terminal 27 being applied as a "0". In detail, gate 126 is connected to gate 122 of P channel device 121. Main electrode 123 is connected to a source of positive voltage 60 and main electrode 124 is connected to main electrode 128 with an output being taken at their intersection on conductor 130. Main electrode 129 of N channel device 125 is connected to ground 27.

The logic configurations of inverters 15, 16 and 18 are exactly the same as that of inverter 12 and need not be discussed in such great detail. Inverter 18, for example, has P channel device 181 and N channel device 182 with an electrical connection to the positive voltage source 60 and ground with interconnections between their gates and main electrodes made exactly as described for inverter 12.

Inverters 15 and 16 are also logically connected in exactly the same way as inverter 12. However, special attention must be paid to inverters 15 and 16. They are designed to cut off at a lower frequency than all of the other CMOS logic circuits and their cut off must be in a predictable state. With reference to inverter 15, P channel device 151 and N channel device 152 have an output taken on line 155. To insure that devices 151 and 152 cut off before all of the other CMOS devices (excepting, of course, devices 161 and 162 of inverter 16) the physical dimensions are made different from the other CMOS devices. Specifically, the distance between the main electrodes is made greater which increases resistance and thereby lowers the frequency response. In this way, inverters 15 and 16 cut off at a frequency of input signal substantially below the cutoff frequency of the other CMOS devices. The P channel device 151 and the N channel device are made geometrically identical. Since the mobility of electrons is an order of magnitude higher than that of holes, the N channel device 152 has a higher frequency response than P channel device 151. Therefore, as the input frequency increases, N channel device 152 continues to respond to a "1" after the P channel device 151 has stopped responding to "0" signals. When N channel device 152 no longer responds, its output on 155 is then a logic "0". These comments apply to inverter 16 and P channel device 161 and N channel device 162 which together produce a logic "0" on output line 165 when the input frequency exceeds 1 Megahertz. The geometry of devices 151, 152, 161 and 162 are identical so that the cutoff of inverters 15 and 16 occurs at the same time. When the cut off does occur, a static, logic "1" as described earlier is the final output. Therefore, the working of inverters 15 and 16 is very important to this invention.

NAND circuits 13 and 14 are identical to each other and therefore the detailed description of circuit 13 which follows will suffice for circuit 14 as well. P channel device 61 has a gate 62 which is connected to input terminal 51 and to the gate 71 of N channel device 70. Main electrode 64 of P channel device 61 is connected to the positive voltage source 60 and the main electrode 63 is connected to main electrode 68 of P channel device 65 and to output line 69. Its gate 66 is connected to the output 130 of inverter 12. It is also connected to the gate 75 of N channel device 74. The main electrode 68 of P channel device 65 is connected to output line 69 and to main electrode 72 of N channel device 70. Main electrode 73 of device 70 is connected to main electrode 76 of N channel device 74 which has its other main electrode 77 connected to ground 27. In summary, N channel devices 70 and 74 are connected in series between ground and the parallel combination of P channel devices 61 and 65 which are connected to a positive voltage source 60. This arrangement insures that a "1" on line 130 and a "1" from input 51 will turn on devices 70 and 74 and turn off devices 61 and 65 thereby causing a "0" to appear on output line 69.

The configuration of NAND circuit 14 is exactly the same as that of circuit 13. Circuit 14 has a pair of parallel P channel devices 141 and 142 connected between positive voltage source 60 and N channel devices 143 and 144 connected in series to ground 27, with an output available on line 145.

Finally, with reference to FIG. 2, NOR circuit 17 will be described. In general terms, two N channel devices 91 and 95 are connected in parallel between ground and a pair of series connected P channel devices 81 and 85 which are connected to positive voltage source 60. This configuration causes the output line 89 to go to "1" when a "0" is received on line 155 and line 165.

In specific detail, line 155 is connected to the gate 86 of P channel device 85 and to the gate 96 of N channel device 95. Line 165 is connected to the gate 82 of P channel device 81 and to the gate 92 of N channel device 91. Thus a signal present on line 165 will turn off one or the other of devices 81 and 91 which is true of a signal present on line 155 with respect to devices 85 and 95. Main electrode 83 of P channel device 81 is connected to positive voltage source 60 and its other main electrode 84 is connected to main electrode 87 of P channel device 85. Main electrode 88 of device 85 is connected to output line 89 and to main electrode 97 of N channel device 95. Main electrode 98 of N channel device 95 is connected to ground 27. Main electrode 97 of device 95 is connected to main electrode 93 of N channel device 91 and main electrode 98 of device 95 is connected to main electrode 94 of device 91. The output 89 serves as an input to inverter 18.

The interconnections within the CMOS NAND, NOR and inverter circuits is a matter of logic choice. Those with ordinary skill in the art are aware that many different configurations are possible. For example, NOR circuit 17 and inverter 18 could be combined to serve the same logical function by substituting an OR circuit.

A logic configuration different from that shown might be employed, depending upon the physical fabrication of these circuits. As mentioned earlier, the CMOS circuits in the preferred embodiment lend themselves well to monolithic, integrated circuit configuration. These circuits also could be discrete, or partially discrete in conformation. A monolithic fabrication could well result in a different choice of logic design than discrete or partially discrete type fabrication.

MODE OF OPERATION

Figure 3:
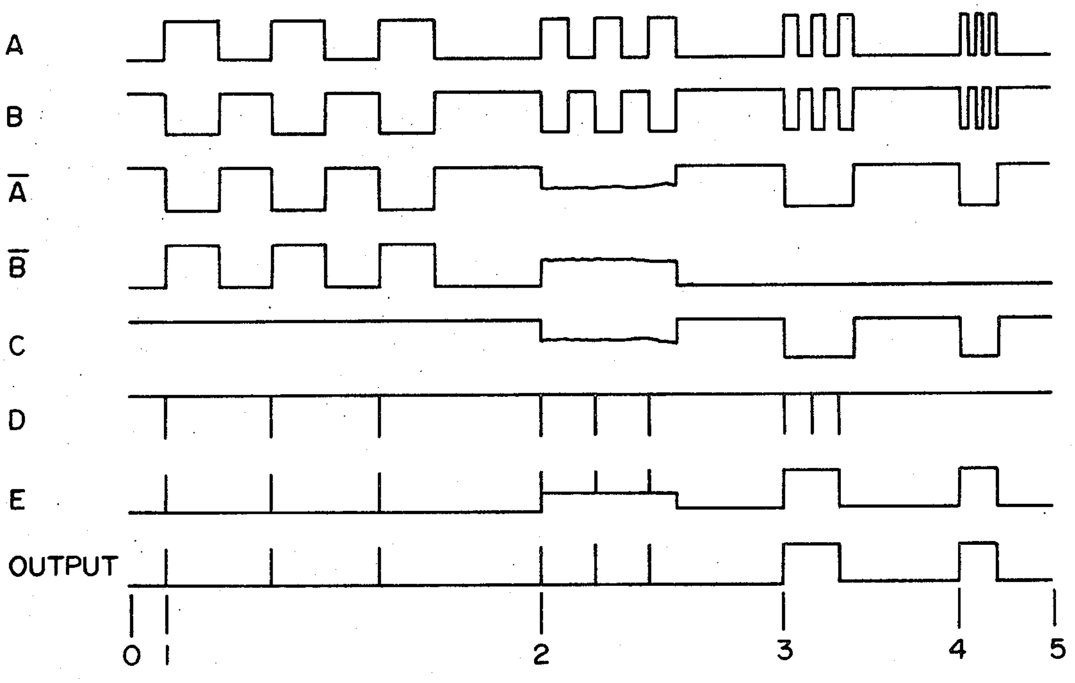
FIG. 3 illustrates idealized signals at particular points shown in FIGS. 1 and 2.

Idealized waveforms are shown in FIG. 3. They are identified by letter at particular points within the circuit as shown in FIGS. 1 and 2. For an understanding of the operation of this circuit, reference should now be made to all three figures.

An analog signal is received at terminal 20 of FIG. 1, being received by the differential amplifier formed by transistors Q1 and Q2, and the associated capacitor and resistors. The differential amplifier produces a pair of complementary, electronic signals shown in FIG. 3 as A and B. Signal A is applied to NAND circuit 13 and to inverter 12. Assuming that the frequency of signal A is that shown between points 1 and 2 on FIG. 3, signal D represents the output of NAND circuit 13. Each spike shown as signal D represents the time width of inverter 12. If the output of inverter 12 was designated "G," then in Boolean form, the output of NAND circuit 13 is:

$$D=\overline{AG}$$

For D to be "1," it is necessary only that A and G not be equal to "1."

The signal D from circuit 13 is sent to NAND circuit 14. For the frequency between point 1 and 2 of FIG. 3, NAND circuit 14 acts simply as an inverter because its conditioning input is activated. That is to say, the output of NAND circuit 14 is shown as signal E on FIG. 1. It is simply the inverse of signal D.

Complementary signals A and B are sent to the latch frequency portion by way of inverters 15 and 16. Again, at the frequency represented between point 1 and point 2 of FIG. 3, the output of inverter 15 is $\overline{A}$ and the output of inverter 16 is $\overline{B}$. NOR circuit 17 receives these two signals. $\overline{A}$ and $\overline{B}$ are both shown in idealized form in FIG. 3. It should be appreciated that in actuality, these signals would be delayed by the inversion time of inverters 15 and 16. This delay is not shown in FIG. 3.

If the output of NOR circuit 17 were designated "H", then in Boolean form:

$$H=\overline{\overline{A}+\overline{B}}$$

The signal is sent to inverter 18, the output of which is shown as signal C in FIG. 3. In Boolean form:

$$C=\overline{A}+\overline{B}$$

An inspection of signal C in FIG. 3 between point 1 and point 2 illustrates this relationship in that when $\overline{A}$ = 0, $\overline{B}$ = 1 and vice versa. $C$ = 1 under these conditions.

The continuous "1" output of inverter 18 is applied to NAND circuit 14 which simply enables the pulses coming from NAND circuit 13 and shown as signal D in FIG. 3 to be inverted by NAND circuit 14 resulting in signal E as shown on FIG. 3, between point 1 and point 2. The output circuit, represented by transistors Q3 and Q4, and the associated capacitor and resistors, simply shapes and adjusts the level of the signal as shown in FIG. 3 as the "output" signal. Under these conditions, the NAND circuit 14 acts simply as an inverter.

Signal A of FIG. 3, between points 2 and 3, illustrates a higher input frequency than between points 1 and 2. This frequency is intended to represent one approaching the cutoff frequency of 1 Megahertz. It should be understood that the 1 Megahertz cutoff frequency is simply illustrative of the preferred embodiment. At that point, NAND circuit 13 continues to function as shown in signal D where output pulses are present. However, the frequency latch circuit begins to react to this higher frequency as evidenced by the outputs $\overline{A}$ and $\overline{B}$ of special inverters 15 and 16 respectively. There it can be seen that the outputs begin to fall off. At that time, the constant "1" output of inverter 18 shown as signal C in FIG. 3 begins to drop off. So long as it does not drop off below the base to emitter voltage drop of 0.7 volts at Q3, the output circuit will respond to the spikes superimposed on the slightly elevated output of NAND circuit 14. This is shown in the output signal of FIG. 3 between points 2 and 3. If the level shown at that point in signal E had been more than 0.7 volts, a static "1" would have appeared at the output of the circuit.

Signal A of FIG. 3 between points 3 and 4 illustrates a frequency that is well above one Megahertz. Under these circumstances, NAND circuit 13 continues to pass pulses as indicated by signal D of FIG. 3. However, both waveforms $\overline{A}$ and $\overline{B}$ have gone to 0 causing the signal C to go to 0. Since signal C conditions NAND circuit 14, the signal D will not be inverted. Instead, the output of NAND circuit 14, with one "0" input must go to "1" as shown by signal E and by the output signal of FIG. 3.

The input frequency of signal A as shown between points 4 and 5 simply illustrates that, as expected, the output signal will go to a static "1" and that further, there is no response through NAND circuit 13 so that no spikes occur as shown by signal D.

As mentioned above, the skilled technician familiar with the digital art, is perfectly capable of arranging logic configurations different from those of the preferred embodiment. Of course, the spirit and scope of this invention extend beyond the limits of the specific embodiment herein shown and encompass those embodiments which achieve the same result and are available to persons of ordinary skill in the art.

We claim:

1. A micro-power zero-crossing detector having input means comprising an amplifier for providing electronic complementary signals in response to the zero crossings of electronic input signals, the improvement comprising:

a. detecting means comprised of complementary FET's, responsive to one polarity of the complementary signals, for producing a unidirectional electronic pulse for each of the one polarity signals;

b. gating means having an input connected to the detecting means, and having a conditioning input, for passing the unidirectional pulses when a first voltage level is present on the conditioning input, and for providing an indicator voltage when a second voltage level is present on the conditioning input; and c. latching means comprised of complementary FET's, having an output connected to the conditioning input, responsive to both polarities of complementary signals, for producing the first voltage level through a predetermined frequency range of the complementary signals, and for producing the second voltage level when the frequency of the complementary signals is outside the predetermined frequency range.

2. The detector of claim 1 wherein the gating means are comprised of complementary FET's.

3. The detector of claim 2 wherein the detecting means further comprise:

a. i. a first inverter, having an output, and having an input connected to the amplifier; and ii. a NAND circuit having an input connected to the output of the first inverter and having another input connected to the amplifier.

4. The detector of claim 2 wherein the latching means further comprise:

c. i. A second inverter, operatively connected to receive and invert one polarity of the complementary signals within the predetermined frequency range, and to provide a lower amplitude voltage level than that of the inverted signals in response to a frequency of complementary signals outside the predetermined frequency range;

ii. a third inverter operatively connected to receive and invert the other polarity of the complementary signals within the predetermined frequency range and to provide the lower amplitude voltage level in response to complementary signals at a frequency outside the predetermined frequency range; and iii. an OR circuit operatively connected to receive the outputs of the second and third inverters respectively, for receiving and passing the inverted complementary signals from the second and third inverters, and for providing the second voltage level at the conditioning input when the second and third inverters provide the lower amplitude voltage level.

5. The detector of claim 4 wherein the OR circuit is comprised of a NOR circuit having an output connected to a third inverter.

6. The detector of claim 5 wherein the complementary FET's are all CMOS circuits.

7. The detector of claim 6 wherein the second and third inverters each comprise one CMOS P channel device and one CMOS N channel device having identical geometric configurations causing the N channel device to have a higher frequency response so that both the second and third inverters produce the lower amplitude voltage level when the complementary signals are at a frequency outside the predetermined frequency range, the P channel and N channel devices being dimensioned to cease responding at a lower frequency than the other CMOS devices.

* * * * *